United States Patent [19]

Hawerkamp

[11] Patent Number: 4,678,526
[45] Date of Patent: Jul. 7, 1987

[54] METHOD AND APPARATUS FOR FORMING DRAIN PIPES

[76] Inventor: Manfred Hawerkamp, Altenrather Strasse 5, 5210 Troisdorf, Fed. Rep. of Germany

[21] Appl. No.: 775,486
[22] Filed: Sep. 12, 1985

[30] Foreign Application Priority Data

Sep. 15, 1984 [DE] Fed. Rep. of Germany ....... 3433931

[51] Int. Cl.$^4$ .............................................. B32B 31/00
[52] U.S. Cl. ............................ 156/195; 156/244.13; 156/244.15; 156/244.18; 156/252; 264/156
[58] Field of Search ...................... 156/244.13–244.15, 156/244.18, 143, 195, 252; 264/156

[56] References Cited

U.S. PATENT DOCUMENTS

| | | | |
|---|---|---|---|
| 3,161,554 | 12/1964 | Blackford | 264/156 X |
| 3,300,355 | 1/1967 | Adams | 156/244.13 X |
| 3,477,891 | 10/1969 | Hawerkamp | 156/244.13 X |
| 4,470,942 | 9/1984 | Beretta | 264/156 X |
| 4,473,525 | 9/1984 | Orori | 264/156 X |
| 4,500,284 | 2/1985 | Lupke | 156/244.18 X |

Primary Examiner—David Simmons
Attorney, Agent, or Firm—McGlew and Tuttle

[57] ABSTRACT

A method of manufacturing drain pipes comprises extruding a strip from an extruder into a plasticized strip form, winding the extruder strip into a continuous spiral of successive coils, joining the lateral edges of the successive coils, and perforating the plasticized strip. The strip is advantageously perforated after it is extruded and before it is wound. An apparatus for effecting the formation of drain pipe comprises an extruder for extruding the plasticized continuous strip onto a winding drum as the drum is continuously wound and the strip is advanced along the drum to form successive spiral forms which has means for welding the lateral edges of the coils of the strip and including a rotable disc member having circumferentially spaced projections which rotates adjacent the winding drum and perforates the extruded sheet as it is formed. In accordance with a preferred method of the invention a drain pipe is formed by extruding the plastic strip into a plasticized form from an extruder, winding the extruded strip into a continuous spiral of successive coils and joining the lateral edges of the successive coils and perforating the plasticized strip, preferably before it is wound or as it is being wound.

2 Claims, 3 Drawing Figures

METHOD AND APPARATUS FOR FORMING DRAIN PIPES

FIELD AND BACKGROUND OF THE INVENTION

The invention relates in general to the construction of drain pipes and in particular to a new and useful method and apparatus for forming drain pipes from plasticizable material.

The invention relates to a method for the manufacture of drain pipes, in particular pipes for the dewatering and degassing of waste dumps, from helically wound thermoplastic strip, in which the plastic strip, after emerging from an extruder or after being heated, and, in any case, being in a plasticized condition, is wound with an inclined winding seam on a winding mandrel and welded in the area of the winding seam.

Drain Pipes for dewatering and degassing are usually made from finished pipe. In that case drainage slits are sawed or milled in the pipe after it has been cooled and hardened. This is an expensive operation and requires expensive equipment. In addition, a considerable amount of material is wasted and additional energy is consumed for sawing or milling. The invention is intended to eliminate these disadvantages.

SUMMARY OF THE INVENTION

The invention provides a method according to which drain pipes, in particular pipes for the dewatering and degassing of waste dumps, can be manufactured in a particularly efficient and energy-conserving manner, possibly also without scrap.

In accordance with a method of the invention a plastic strip is perforated, slotted or hole-punched in a plasticized condition while the pipe is being manufactured. The invention is based on the finding that the sizing of the pipe takes place on the winding mandrel and, consequently, the plastic strip which is in a plasticized condition can be perforated, slotted or hole-punched before or during the sizing operation.

According to a preferred embodiment of the invention the plastic strip is perforated, slotted or hole-punched immediately after being extruded and before it is wound on the mandrel.

According to another embodiment of the invention of independent importance, the plastic strip is perforated, slotted or hole-punched after having been wound on the mandrel.

The suggestion of the invention, according to which the plastic strip is perforated, always has independent importance because such a perforation of the plastic strip in the plasticized condition eliminates all scrap. In addition, the perforations open while the finished wound pipe is cooling; this is caused by the shrinking resulting from the cooling. In fact, the shrinking causes these perforations to become sufficiently large drainage holes. A similar, although less pronounced effect occurs if the plastic strip is not perforated but slotted or hole-punched. Regardless of whether the plastic strip is perforated, slotted or hole-punched, a substantial saving of energy is always realized, because the processing of the plastic strip takes place and can take place in the plasticized range. The actual sizing of the pipe in question takes place, as mentioned above, while it is being wound on the winding mandrel.

Other characteristics of the invention are enumerated herein. It is possible, to perforate, slot or hole-punch the plastic strip in a predetermined area, e.g. only in the area of the winding seam. According to another embodiment of the invention, the plastic strip wound on the mandrel is perforated, slotted or hole-punched only in a predetermined area, for example over ⅔ of its periphery, in order to form a closed drainage channel. A drain pipe is thus created which can be placed in the ground or the waste dump with the drainage channel at the bottom so that the collected water can run off without difficulties.

Another subject of the invention is a device for practicing the claimed method, which features a particularly simple and functional design. This device is characterized by a perforating or punching device which can be brought into contact with the extruded plastic strip. This perforating or punching device can, for example, be located between the extruder and the winding mandrel.

According to a preferred embodiment of the invention with independent importance the perforating device is a freely rotatable gear which can be brought into contact with the winding drum and which, when it is in the position in which it makes contact with the winding drum, is thus driven by the rotating winding drum. This arrangement results in continuous perforation of the plastic strip being wound on the winding drum. The gear may comprise two or more gear rings with identical head diameter and with teeth which are staggered in relation to each other, so that perforations are generated which are staggered against each other, resulting in staggered drainage openings. The invention also recommends that the gear, or its bearing or its bearing pillows are connected through a system of levers to a controlled actuating device, for example to a hydraulically or pneumatically operated cylinder piston system, so that the perforations may be generated in certain areas. For this purpose the gear can be brought into contact with the winding drum or be placed in an idling position. The control of the cylinder piston system can, for example, be exerted by a control cam on the rotating winding drum which cooperates with a cam follower that in turn actuates the pneumatic or hydraulic system for the cylinder piston system.

The advantages obtained by means of the invention are essentially that a method and a device are presented which permit the particularly efficient and energy-saving manufacture of drain pipes, in particular for the dewatering and degassing of waste dumps. Efficient production is ensured because the perforations and the drainage openings generated from them can be produced directly in the plasticized plastic strip after it emerges from the extruder or is wound on the winding drum, i.e. while the pipe is being manufactured. Consequently separate secondary operations such as sawing and milling and the like are no longer required. Energy is saved during the manufacturing process because perforating a plasticized plastic strip requires considerably less energy than milling or sawing. Furthermore, material is saved because the perforating of the plasticized plastic strip is done without producing any scrap.

Accordingly it is an object of the invention to provide an improved method of manufacturing drain pipes which comprise extruding a strip into a plasticized strip form from an extruder, winding the extruder strip into a continuous spiral of successive coils, joining the lateral edges of the successive coils and perforating the plasticized strip.

A further object of the invention is to provide a device for forming perforated drain pipes which comprise means for extruding the continuous strip of plastic onto a drum as it is rotated and as the extruded material is moved along the drum to form successive coils of plasticized sheet material providing means for joining successive coils of the sheet material together to form a pipe and rotating a member having a plurality of projections on its surface at spaced circumferential locations so that it contacts the sheet material and provides a perforation therethrough while it is still in a plasticized state.

A further object of the invention is to provide a device for forming drain pipes which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 3:
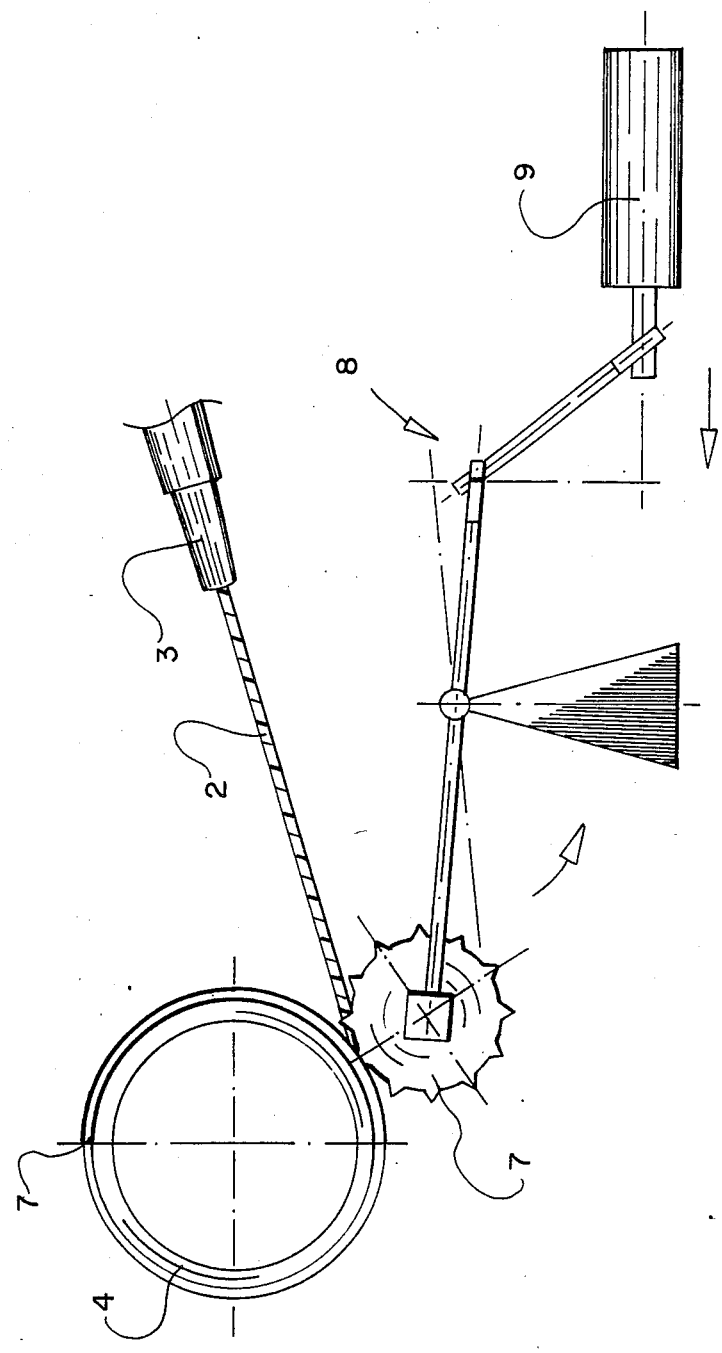
FIG. 3 is a schematic side elevational view of a device for making drain pipes according to the invention.

Referring to the drawings in particular the invention embodied therein comprises a drain pipe 1 which is formed of successive coils of plasticized material which is extruded from an extruder 3 in the form of plasticized sheets 2 which are continuously wound on a mandrel 4 to form a drain pipe 1. The extruded plasticized material 2 is advanced along the drum 4 as it is rotated and the lateral edges of successive coils are bound together by binding means 16 as shown in FIG. 3. The plasticized sheet 2 is advantageously perforated either before it is wound or as it is wound or even after it is wound and while still in a plasticized state by applying the perforations from a disc or gear member 7 having a plurality of spaced circumferential projections 7, 8 thereon.

Figure 1:
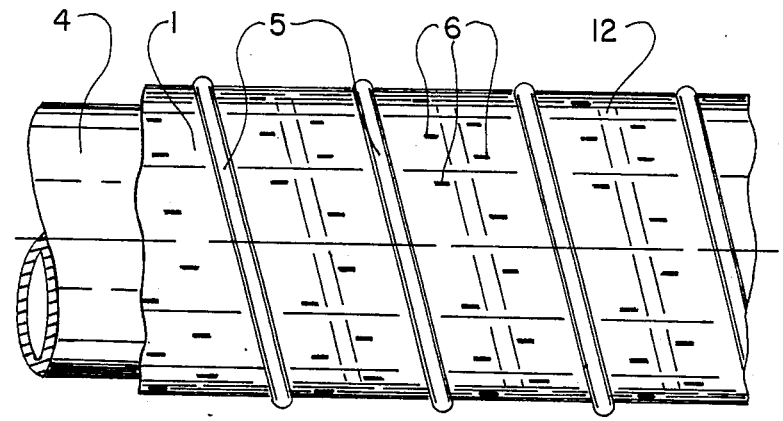
FIG. 1 is a side elevational view of a part of a pipe wound on a winding mandrel and perforated according to the method of the invention.
Figure 2:
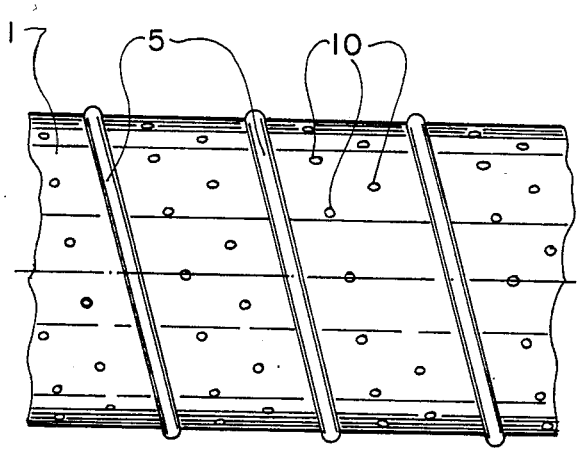
FIG. 2 is a view similar to FIG. 1 of a perforated part of a pipe after cooling, with the perforations which have been expanded to drainage openings by shrinkage.

FIGS. 1 and 2 show a drain pipe 1 for the dewatering and degassing of waste dumps. This drain pipe 1 comprises a helically wound thermoplastic strip, with plastic strip 2 having been wound, immediately after emerging from an extruder 3 (FIG. 3) or after being heated, but in any case in a plasticized condition. The pipe 1 has a spiral or inclined winding seam 12 on winding mandrel 4 and having been welded in the area of the welding seam 12. Drain pipe 1 may comprise reinforcing profile 5 with or without supporting hose.

Plastic strip 2 is perforated in a plasticized condition. Perforating may take place after extrusion and before winding, but also after winding on winding mandrel 4. There exists also the possibility to perforate plastic strip 2 in predetermined areas, for example in the are of the winding seam 12. It is also possible to perforate plastic strip 2 wound on winding mandrel 4 only in a predetermined area of its periphery in order to form a closed drainage channel at the bottom.

In order to produce the perforations 6, a perforating device is provided which can be brought into contact with the extruded plastic strip 2. The perforating device is a freely rotatable spiked disc or gear 7 which can be brought into contact with the winding mandrel forming a winding drum 4. If the gear 7 is in contact with winding drum 4 it is advantageously driven by the rotating winding drum 4 as it rotates. Gear 7 may comprise two or more gear rings or discs with identical head diameters and with teeth that are staggered laterally in relation to each other.

Gear 7 or its bearings are connected through lever system 8 to a controlled actuating device 9, i.e. a hydraulically or pneumatically operated cylinder-piston system. Cylinder-piston 9 thus permits a periodical contact of the gear 7 with the winding drum 4. The cylinder-piston is controlled by means of a cam on the winding drum and a cam follower in contact therewith (not shown), which in turn actuates the hydraulic or pneumatic system powering cylinger-piston system 9. The perforations 6 expand to drainage openings 10 because of the shrinkage taking place when the finished drain pipe is cooled.

The invention relates to a method for the manufacture of drain pipes for the dewatering and degassing of waste dumps, with said drain pipes consisting of helically wound thermoplastic strip. The plastic strip is perforated in a plasticized condition, producing drainage openings in the pipe mantle due to the cooling and the resulting shrinking. Perforating can take place either after the extrusion and before winding or after the plastic strip has been wound on the winding mandrel, as long as the plastic strip is in the plasticized condition. This ensures efficient manufacturing while saving energy and material.

While specific embodiments of the invention have been shown and described in detail to illustrate the application of the principles of the invention, it will be understood that the invention may be embodied otherwise without departing from such principles.

What is claimed is:

1. A method for manufacturing drainage pipe for the dewatering and degassing of waste material, comprising extruding a plastic band of thermoplastic material, the plastic band being heated to the plastic state, winding the plastic band in a helical path on a winding spindle while the plastic band is still heated and in its plastic state, the helical path causing turns of the plastic band to overlap in a winding seam, the turns of plastic band becoming welded together at the winding seam, and perforating the plastic band with perforations which extend entirely through the plastic band while the plastic band is still in its plastic state and after the plastic band has been wound onto the winding spindle.

2. A method according to claim 1 including pressing a toothed wheel against the plastic band while it is still in its plastic state and after it has been wound on the winding spindle to form the perforations in the plastic band.

* * * * *